US011463674B1

(12) United States Patent
Ollila

(10) Patent No.: US 11,463,674 B1
(45) Date of Patent: Oct. 4, 2022

(54) IMAGING SYSTEM AND DISPLAY APPARATUS INCORPORATING SUPER RESOLUTION USING FIXED FOCUS CAMERAS

(71) Applicant: Varjo Technologies Oy, Helsinki (FI)

(72) Inventor: Mikko Ollila, Tampere (FI)

(73) Assignee: Varjo Technologies Oy, Helsinki (FI)

( * ) Notice: Subject to any disclaimer, the term of this patent is extended or adjusted under 35 U.S.C. 154(b) by 0 days.

(21) Appl. No.: 17/326,673

(22) Filed: May 21, 2021

(51) Int. Cl.
| | |
|---|---|
| *H04N 13/243* | (2018.01) |
| *H04N 5/225* | (2006.01) |
| *H04N 5/232* | (2006.01) |
| *G02B 27/00* | (2006.01) |
| *G02B 27/01* | (2006.01) |

(52) U.S. Cl.
CPC ....... *H04N 13/243* (2018.05); *G02B 27/0093* (2013.01); *G02B 27/0172* (2013.01); *H04N 5/2258* (2013.01); *H04N 5/2259* (2013.01); *H04N 5/23232* (2013.01); *H04N 5/23293* (2013.01); *G02B 2027/014* (2013.01); *G02B 2027/0138* (2013.01)

(58) Field of Classification Search
CPC ............... H04N 5/2258; H04N 5/2259; H04N 5/23232; H04N 5/23293; H04N 13/243; G02B 2027/0138; G02B 2027/014; G02B 27/0093; G02B 27/0172
See application file for complete search history.

(56) References Cited

U.S. PATENT DOCUMENTS

| | | | |
|---|---|---|---|
| 10,949,947 B2 * | 3/2021 | Steyskal | ............... G06T 3/0012 |
| 11,206,364 B1 * | 12/2021 | Price | ....................... G06F 3/013 |
| 2021/0258549 A1 * | 8/2021 | Ghazaryan | ......... G02B 27/0172 |

* cited by examiner

*Primary Examiner* — Nelson D. Hernández Hernández
(74) *Attorney, Agent, or Firm* — Ziegler IP Law Group, LLC

(57) ABSTRACT

An imaging system including: first camera; N second cameras, optical axes of first and second cameras being arranged at an angle; and processor(s) configured to: control first camera and N second cameras to capture first image and N second images, second field of view (FOV) is narrower than first FOV and overlaps with portion of first FOV; determine first overlapping portions (P, P', A, A', A"), second overlapping portion(s) (Q, B, B', B"), and third overlapping portion (C) of first image; for given overlapping portion of first image, determine corresponding overlapping portion of at least one of N second images; and process corresponding overlapping portions of first and second images to generate corresponding portion of output image.

30 Claims, 8 Drawing Sheets

IMAGING SYSTEM AND DISPLAY APPARATUS INCORPORATING SUPER RESOLUTION USING FIXED FOCUS CAMERAS

TECHNICAL FIELD

The present disclosure relates to imaging systems incorporating super resolution using fixed focus cameras. Moreover, the present disclosure also relates to display apparatuses incorporating super resolution using fixed focus cameras.

BACKGROUND

Imaging systems are widely used across several industries to capture images for many applications such as extended-reality (XR) applications, entertainment, surveillance, education, and the like. Generally, imaging systems employ multiple cameras for capturing the images of the real-world environment. Ideally, the images are required to replicate (i.e., emulate) human eye resolution, in order to provide a realistic viewing experience to a user viewing the images. The human eye resolution is quite high and is spatially variable, therefore replicating it properly is quite challenging.

Typically, in order to replicate human eye resolution using an imaging system, a given camera of the imaging system requires a certain focal length in addition to small pixel size. Since it is not feasible to decrease the pixel size beyond a given limit, the focal length is required to be increased. Having an increased focal length leads to a requirement of implementing automatic focus (AF) in the given camera, which automatically changes the focal length as required in order to change a focusing distance of the given camera. Additionally, large highly distorted lenses are often required to provide the increased focal length. Using such distorted lenses and implementing automatic focus considerably increases a complexity of the imaging system. An alternative approach is to utilise multiple-aperture systems (i.e., multiple cameras having apertures) having multiple prisms with dispersions, in the imaging system. Such a solution is impractical since it requires a large number of cameras and high computing power for capturing and processing images at a high rate (for example, such as 90 image frames per second). For example, some existing imaging systems utilise about 25 cameras having low resolution, wherein the 25 cameras are arranged as an array along with the multiple prisms. The multiple prisms cause undesirable chromatic aberration. Moreover, providing super resolution in such an example would require boosting single-camera resolution by approximately 25 times. This has considerable calibration requirements and is therefore challenging to implement as there is 25 times more possible mechanical movement of the 25 cameras than for a single camera. Additionally, the large number of cameras being utilised have a large disparity between them. The large disparity between the cameras adversely impacts an image quality of the output image which is generated using the images captured by the cameras.

Therefore, in light of the foregoing discussion, there exists a need to overcome the aforementioned drawbacks associated with conventional imaging systems.

SUMMARY

The present disclosure seeks to provide an imaging system incorporating super resolution using fixed focus cameras. The present disclosure also seeks to provide a display apparatus incorporating super resolution using fixed focus cameras. An aim of the present disclosure is to provide a solution that overcomes at least partially the problems encountered in prior art.

In one aspect, an embodiment of the present disclosure provides an imaging system comprising:
 a first camera;
 N second cameras, an optical axis of a given second camera being arranged at an angle that is lower than a predefined threshold angle with respect to an optical axis of the first camera; and
 at least one processor configured to:
  control the first camera and the N second cameras to capture simultaneously a first image and N second images of a real-world environment, respectively, wherein a second field of view captured in a given second image is narrower than a first field of view captured in the first image and overlaps with a portion of the first field of view;
  determine a plurality of first overlapping portions of the first image that overlap with any one of the N second images, at least one second overlapping portion of the first image that overlaps with any two of the N second images, and a third overlapping portion of the first image that overlaps with each of the N second images;
  for a given overlapping portion of the first image, determine an overlapping portion of at least one of the N second images that overlaps with the given overlapping portion of the first image; and
  process the given overlapping portion of the first image and the overlapping portion of the at least one of the N second images to generate a corresponding portion of an output image.

In another aspect, an embodiment of the present disclosure provides a display apparatus comprising:
 at least one light source per eye;
 a first camera per eye;
 N second cameras per eye, an optical axis of a given second camera being arranged at an angle that is lower than a predefined threshold angle with respect to an optical axis of the first camera; and
 at least one processor configured to:
  control the first camera and the N second cameras to capture simultaneously a first image and N second images of a real-world environment, respectively, wherein a second field of view captured in a given second image is narrower than a first field of view captured in the first image and overlaps with a portion of the first field of view;
  determine a plurality of first overlapping portions of the first image that overlap with any one of the N second images, at least one second overlapping portion of the first image that overlaps with any two of the N second images, and a third overlapping portion of the first image that overlaps with each of the N second images;
  for a given overlapping portion of the first image, determine an overlapping portion of at least one of the N second images that overlaps with the given overlapping portion of the first image;
  process the given overlapping portion of the first image and the overlapping portion of the at least one of the N second images to generate a corresponding portion of an output image; and
  display the output image via the at least one light source.

Embodiments of the present disclosure substantially eliminate or at least partially address the aforementioned problems in the prior art, and enable the imaging system and the display apparatus having the first camera and the N second cameras to effectively provide super resolution in the output image using foxed focus cameras, wherein the output image emulates human-eye resolution.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those skilled in the art will understand that the drawings are not to scale. Wherever possible, like elements have been indicated by identical numbers.

Embodiments of the present disclosure will now be described, by way of example only, with reference to the following diagrams wherein:

FIG. 4A illustrates an exemplary arrangement of a first camera and two second cameras, while

FIG. 5A illustrates an exemplary arrangement of a first camera and three second cameras with respect to an optical axis of the first camera, while

FIGS. 7B and 7C illustrate two second images captured by the two second cameras of FIG. 7A, while

Figure 1:
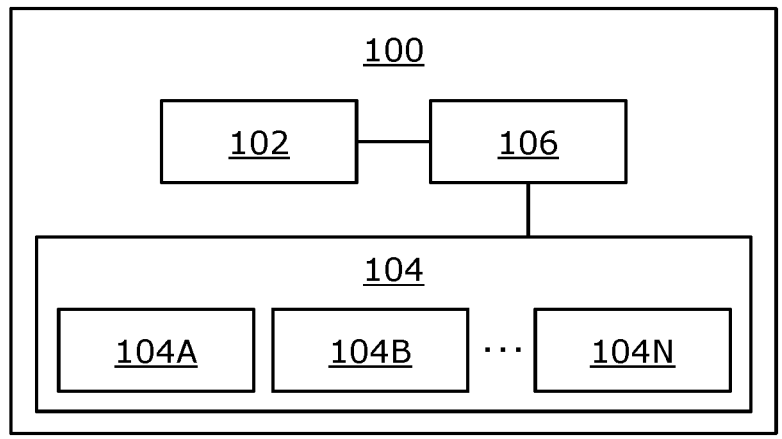
FIG. 1 illustrates a block diagram of an architecture of an imaging system, in accordance with an embodiment of the present disclosure.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practising the present disclosure are also possible.

In one aspect, an embodiment of the present disclosure provides an imaging system comprising:
  a first camera;
  N second cameras, an optical axis of a given second camera being arranged at an angle that is lower than a predefined threshold angle with respect to an optical axis of the first camera; and
  at least one processor configured to:
    control the first camera and the N second cameras to capture simultaneously a first image and N second images of a real-world environment, respectively, wherein a second field of view captured in a given second image is narrower than a first field of view captured in the first image and overlaps with a portion of the first field of view;
    determine a plurality of first overlapping portions of the first image that overlap with any one of the N second images, at least one second overlapping portion of the first image that overlaps with any two of the N second images, and a third overlapping portion of the first image that overlaps with each of the N second images;
    for a given overlapping portion of the first image, determine an overlapping portion of at least one of the N second images that overlaps with the given overlapping portion of the first image; and
    process the given overlapping portion of the first image and the overlapping portion of the at least one of the N second images to generate a corresponding portion of an output image.

In another aspect, an embodiment of the present disclosure provides a display apparatus comprising:
  at least one light source per eye;
  a first camera per eye;
  N second cameras per eye, an optical axis of a given second camera being arranged at an angle that is lower than a predefined threshold angle with respect to an optical axis of the first camera; and
  at least one processor configured to:
    control the first camera and the N second cameras to capture simultaneously a first image and N second images of a real-world environment, respectively, wherein a second field of view captured in a given second image is narrower than a first field of view captured in the first image and overlaps with a portion of the first field of view;
    determine a plurality of first overlapping portions of the first image that overlap with any one of the N second images, at least one second overlapping portion of the first image that overlaps with any two of the N second images, and a third overlapping portion of the first image that overlaps with each of the N second images;

for a given overlapping portion of the first image, determine an overlapping portion of at least one of the N second images that overlaps with the given overlapping portion of the first image;

process the given overlapping portion of the first image and the overlapping portion of the at least one of the N second images to generate a corresponding portion of an output image; and display the output image via the at least one light source.

The present disclosure provides the aforementioned imaging system and the aforementioned display apparatus. The imaging system utilizes the first camera and the N second cameras, which are fixed focus cameras, while incorporating super resolution to generate the output image. The output image whose portions are generated by processing corresponding overlapping portions of the first image and at least one of the N second images effectively emulates human eye resolution. In other words, an image quality of the output image is high since the output image has super resolution in its portions which are generated using the first image and the at least one of the N second images, and therefore such an output image can be used for various applications. The first camera provides a high baseline resolution for the output image and the first image is always well-focused (as focusing distance of the first camera spans for example, from 20 cm to infinity). It is therefore easier to build super resolution on top of this high baseline resolution, using the N second images captured by the N second cameras. Furthermore, the imaging system is simple in its design, easy to use, uses moderate computing power and effectively provides high super resolution in certain portions of the output image without requiring automatic focus or having disparity between the first camera and the N second cameras. The imaging system is compact, lightweight, utilizes simple arrangements of its components, and is easily embeddable in other specialized devices (for example, such as display apparatuses). The imaging system is free from chromatic aberration and has minimal calibration requirements as it uses a small number of cameras. The aforementioned display apparatus beneficially has all the aforementioned attributes of the imaging system.

Throughout the present disclosure, the term "imaging system" refers to an apparatus for imaging the real-world environment. The imaging system may be used for imaging real-world environments for a variety of applications including but not limited to extended-reality (XR), inspection of the real-world environment, machine vision, gaming, art, and so forth.

Optionally, the imaging system generates output images for the display apparatus. These output images have a variable resolution that mimics human-eye resolution. Throughout the present disclosure, the term "display apparatus" refers to specialized equipment that is configured to present an extended-reality (XR) environment to a user when the display apparatus in operation is worn by the user on his/her head. In such an instance, the display apparatus acts as an XR device (for example, such as an XR headset, a pair of XR glasses, and the like) that is operable to present a visual scene of the XR environment to the user. Commonly, the "display apparatus" is referred to as "head-mounted display apparatus", for the sake of convenience only. Throughout the present disclosure, the term "extended-reality" encompasses virtual reality (VR), augmented reality (AR), mixed reality (MR), and the like.

In some implementations, the imaging system is integrated with the display apparatus. In such implementations, the imaging system is physically coupled to the display apparatus (for example, attached via mechanical and/or electrical connections to components of the display apparatus). For example, an imaging system per eye may be arranged on an outer surface of the display apparatus that faces the real-world environment. Optionally, in such implementations, the at least one processor of the imaging system serves as at least one processor of the display apparatus. Alternatively, optionally, in such implementations, the at least one processor of the imaging system is communicably coupled to at least one processor of the display apparatus.

In other implementations, the imaging system is implemented on a remote device that is separate from the display apparatus. In such implementations, the at least one processor of the imaging system and at least one processor of the display apparatus are communicably coupled, wirelessly and/or in a wired manner. Optionally, the imaging system is mounted on the remote device. Examples of the remote device include, but are not limited to, a drone, a vehicle, and a robot. Optionally, the remote device is physically positioned at the real-world environment, whereas the user of the display apparatus is positioned away from (for example, at a distance from) the remote device.

The first camera is a wide-angle camera. This means that the first camera captures a wide field of view of the real-world environment. It will be appreciated that since the first camera is the wide-angle camera, it has a short (i.e., small) focal length. Optionally, the field of view of the first camera lies in a range of 60 to 220 degrees. Optionally, the focal length of the first camera lies in a range of 0.1-3 millimetres. For example, the focal length of the first camera may be from 0.1, 0.2, 0.3, 0.4, 0.5, 0.7, 0.9, 1.2, 1.5, 1.8, 2.25 or 2.7 millimetres up to 0.5, 0.75, 1, 1.25, 1.75, 2.25 or 3 millimetres. Other focal lengths of the first camera that lie within and outside the aforesaid range are also feasible.

The N second cameras are narrow-angle cameras. This means that each of the N second cameras captures a narrow field of view of the real-world environment. Optionally, the N second cameras are implemented as N telephoto cameras. The N telephoto cameras have a narrow field of view and a long (i.e., large) focal length. Notably, a field of view of a given second camera is narrower than a field of view of the first camera and overlaps with a given portion of the field of view of the first camera. Optionally, the field of view of the given second camera lies in a range of 5-45 degrees.

Optionally, the focal length of the N second cameras is more than 70 millimetres. For example, the focal length of the N second cameras may be 70, 75, 80, 85, 90, 95, 100, 105, 110, 115, 120, 125, 130, 135, 140, 145, 150, 155, 160, 165, 170, 175, 180, 185, 190, 195, 200 millimetres, and so forth. Other focal lengths of the N second cameras are also feasible.

Optionally, N is a number selected from the group consisting of 2, 3, 4 and 5. In this regard, a total number of cameras employed per eye in the imaging system is equal to N+1, since the imaging system comprises the N second cameras and one first camera. Therefore, in the imaging system, the total number of cameras employed to achieve super resolution lies in a range of 3 to 6, which is quite less. This facilitates in simplifying a design of the imaging system, lowering a cost of manufacturing the imaging system, and increasing reliability of the imaging system, without compromising on visual quality provided in the output image generated by the imaging system.

Optionally, the first camera and the N second cameras are focus free, and wherein at least two of the N second cameras have at least one of: different focal lengths, different focusing distances, different distortion profile. The first camera and the N second cameras being focus free means that the first camera and the N second cameras have a fixed focus. Since all cameras employed in the imaging system are focus free, the different focal lengths and/or the different focusing distances and/or the different distortion profile are used to provide a large depth of field in the captured N second images. This eliminates a need for autofocusing of the cameras employed in the imaging system. It will be appreciated that a focusing distance of a fixed-focus camera is set to a specific focal plane (such as infinity, hyperfocal planes, 50 cm, or similar) during manufacturing of the fixed-focus camera by arranging a chart at the focusing distance and arranging a camera lens of the fixed focus camera at a position where maximum focus for the focusing distance is achieved.

Optionally, the at least two of the N second cameras have different focal lengths and/or different focusing distances. The different focal lengths of the at least two of the N cameras enable the at least two of the N cameras to focus at different depth of focus ranges and different focusing distances in the real-world environment. Optionally, a focusing distance of a given second camera lies in a range of 50 cm to infinity. For example, the focusing distance of the given second camera may be from 50, 55, 60, 65, 70, 75, 80, 85, 90, 95, 100, 105, 110, 115 or 120 cm up to 25, 30, 35, 40, 45, 50, 55, 60, 65, 70, 75, 80, 85, 90, 95, 100, 105, 110, 115, 120 or infinity cm. It will be appreciated that as the focusing distance of the given portion of the given second camera increases, a requisite focal length of the given second camera decreases, and vice versa. Optionally, different N second cameras have different focal lengths.

Optionally, the at least two of the N second cameras may have different distortion profiles. This means that a given camera amongst the at least two of the N second cameras may use a specialized lens for imaging the real-world environment in a spatially variable manner. Such a specialized lens has spatially variable focal length, wherein the focal length varies spatially across different portions of the specialized lens to provide a distortion profile of the specialized lens. The at least two of the N second cameras may provide different levels of magnification to light passing therethrough, providing the different distortion profiles. Optionally, different N second cameras may have different distortion profiles. A given distortion profile could be constant, linear, non-linear, or a combination of these. Notably, the given distortion profile could have increasing distortion or decreasing distortion. Moreover, the given distortion profile could be symmetric, asymmetric or anamorphic. In an example, some of the N cameras are have different focal lengths and remaining second cameras of the N second cameras have different distortion profiles. In another example, at least two of the N second cameras have different distortion profiles, wherein a focal length at a centre of specialized lenses of such cameras may be same. In such an example, the at least two of the N second cameras may be asymmetrically arranged with respect to the first camera, to facilitate in obtaining highest super resolution at their common overlapping portion.

The predefined threshold angle limits the angle between the optical axis of a given second camera (from amongst the N second cameras) and the optical axis of the first camera. In some cases, the predefined threshold angle may be the same for all the N second cameras. In other cases, the predefined threshold angle may be different for different N second cameras, depending on an arrangement of the given second camera with respect to the first camera. In yet other cases, the predefined threshold angle may be same for some of the N second cameras, and different for remaining of the N second cameras. In every case, the angle between the optical axis of the given second camera and the optical axis of the first camera is always lower than the predefined threshold angle.

When the optical axis of the given second camera and the optical axis of the first camera are arranged at the angle, the optical axis of the given second camera is tilted with respect to the first camera. Such a tilt orients the field of view of the given second camera with respect to the field of view of the first camera in a required manner, thereby enabling the given second camera to capture a requisite region of the real-world environment. Moreover, the arrangement of the first camera and the N second cameras also reduces a disparity in the fields of view of the first camera and the N second cameras. Furthermore, the aforesaid tilt of the given second camera allows focus of the given second camera to be directed towards the requisite region of the real-world environment. Notably, the first camera is arranged in a manner that the fields of view of the N second cameras lie within the field of view of the first camera.

Optionally, the predefined threshold angle lies in a range of 5-30 degrees. The predefined threshold angle is indicative of physical tilt between the optical axis of the given second camera and the optical axis of the first camera. For example, the predefined threshold angle may be from 5, 7.5, 10, 15, 20 or 25 degrees up to 10, 15, 20, 25 or 30 degrees. Other values of the given predefined threshold angle that lie within and outside the aforesaid range are also feasible.

Since the angle between the optical axis of the given second camera and the optical axis of the first camera is lower than the predefined threshold camera, the (actual) angle between the optical axis of the given second camera and the optical axis of the first camera optionally lies in a range of 0-29 degrees. For example, the (actual) angle between the optical axis of the given second camera and the optical axis of the first camera may be from 0, 2.5, 5, 7.5, 10, 15, 20 or 25 degrees up to 5, 10, 15, 20 or 29 degrees. Other degrees of the given angle that lie within and outside the aforesaid range are also feasible.

For example, if the predefined threshold angle is 5 degrees, the angle between the optical axis of the first camera and the optical axis of the given second camera may be as small as 0-2 degrees. In such a case, there would be a negligible tilt in the optical axis of the given second camera with respect to the first camera. A cropping technique (of cropping a given second image to adjust a field of view captured in a cropped portion of the given second image) may be utilised in such cases. As a result, a central axis of the field of view captured in the cropped portion of the given second image makes an angle that is lower than the predefined threshold angle with respect to the optical axis of the first camera. Moreover, the cropping technique may also be used to compensate manufacturing assembly tolerances in the imaging system and set fields of view of all cameras on correct positions.

Optionally, the N second cameras are arranged at vertices of an equilateral polygon having N sides. In this regard, the N second cameras are positioned in an equilateral manner, which means that the N second cameras have an equal spacing between them. Such an arrangement can be visualised using the equilateral polygon, wherein the N second cameras are arranged at the vertices of the equilateral polygon as the vertices of the equilateral polygon are equally spaced apart from each other. Optionally, the equilateral polygon lies in a plane that is perpendicular to or oblique to the optical axis of the first camera. For example, the equilateral polygon may be a shape including, but not limited to, an equilateral triangle, a square, an equilateral pentagon, or similar. One such exemplary arrangement of the N second cameras has been illustrated in conjunction with FIG. 5A.

Optionally, the N second cameras are arranged surrounding the first camera. In this regard, the N second cameras are arranged on a same side as the first camera. Therefore, light emanating from the real-world environment is incident upon the first camera and the N second cameras, in the same manner. When the N second cameras are arranged surrounding the first camera, the N second cameras are arranged in proximity to the first camera. The N second cameras may surround the first camera in a uniform (i.e., equi-spaced) manner, or a non-uniform (i.e., unequally-spaced) manner.

In an example, the first camera may be surrounded by six second cameras in a manner that three second cameras are arranged on both sides of the first camera, and there exists unequal spacing between any two adjacent cameras. In another example, the first camera may be placed in a centre of an arrangement of the N second cameras that are arranged at the vertices of the equilateral polygon having N sides. In yet another example, four second cameras may be arranged at in proximity to and surrounding the first camera.

In still example, five second cameras may be arranged on vertices of an equilateral pentagon, in a manner that the five second cameras surround the first camera. The first second cameras form a nearly circular arrangement around the first camera. Since the human vision is round, this circular arrangement would assist in acquiring a natural view of the real-world environment as is obtained by human eyes, using the first camera and the five second cameras.

It will be appreciated that when the N second cameras are optionally arranged surrounding the first camera, a disparity between respective fields of views of the first camera and the N second cameras is quite low since the N second cameras are arranged in proximity to each other and to the first camera. With reduced disparity, the first image and the N second images capture a common region of the real-world environment from similar perspectives, capturing considerably more visual information regarding the common region, as compared to visual information which would have been captured without such an arrangement. The N second images captured by the N second cameras are beneficially utilized when generating the output image, to provide super resolution in a corresponding portion of the output image.

In an embodiment, the imaging system further comprises a semi-transparent reflective element arranged in a manner that a portion of light emanating from the real-world environment passes through the semi-transparent reflective element towards the first camera, whilst a remaining portion of the light is reflected from the semi-transparent reflective element towards the N second cameras.

Throughout the present disclosure, the term "semi-transparent reflective element" refers to an optical element having both transmissive and reflective optical properties such that light incident upon the optical element is partly transmitted through the optical element and is partly reflect from the optical element. Optionally, the semi-transparent reflective element is implemented as one of: a semi-transparent reflective mirror, a semi-transparent reflective lens, a semi-transparent reflective prism, a semi-transparent reflective waveguide.

In some implementations, a surface of the semi-transparent reflective element upon which the light is incident is planar. In such implementations, the first camera and the N second cameras may be arranged in a same plane for achieving an overlapping field of view of the first camera and the N second cameras. One such exemplary arrangement has been illustrated in conjunction with FIG. 6B. In other implementations, a surface of the semi-transparent reflective element upon which the light is incident is curved. In such implementations, the first camera and the N second cameras may be arranged in different planes for achieving an overlapping field of view of the first camera and the N second cameras, depending on the curvature of the surface the semi-transparent reflective element.

In another embodiment, the imaging system further comprises a semi-transparent reflective element arranged in a manner that a portion of light emanating from the real-world environment passes through the semi-transparent reflective element towards the N second cameras, whilst a remaining portion of the light is reflected from the semi-transparent reflective element towards the first camera. In this embodiment, positions of the first camera and the N second cameras with respect to the semi-transparent reflective element are swapped as compared to their positions in the previous embodiment. One such exemplary arrangement has been illustrated in conjunction with FIG. 6C.

In yet another embodiment, at least one of the N second cameras is arranged in a proximity of the first camera, and wherein the imaging system further comprises a semi-transparent reflective element arranged in a manner that a portion of light emanating from the real-world environment passes through the semi-transparent reflective element towards the first camera and the at least one of the N second cameras, whilst a remaining portion of the light is reflected from the semi-transparent reflective element towards a remainder of the N second cameras. In this regard, the at least one of the N second cameras are arranged in the proximity to the first camera, and therefore receive the portion of the light passing through the semi-transparent reflective element. In this case, only one/some of the N second cameras is/are arranged in proximity of the first camera, while the remainder of the N second cameras is arranged away from the first camera. One such exemplary arrangement has been illustrated in conjunction with FIG. 6D.

It will be appreciated that the surface of the semi-transparent reflective element may be arranged to face the real-world environment, or the light may be directed towards the surface using additional optical element(s). Moreover, dimensions and arrangement of the semi-transparent reflective element are selected to be such that it effectively directs different portions of the light towards the first camera and the N second cameras. A technical effect for utilising the semi-transparent reflective element is to simplify the arrangement of components in the imaging system, thereby allowing the light to be directed appropriately towards the first camera and the N second cameras.

Optionally, an optical axis of at least one of the N second cameras is aligned with the optical axis of the first camera. Herein, the at least one of the N second cameras is arranged along the optical axis of the first camera, such that the optical axis of the at least one of the N second cameras is same as the optical axis of the first camera. When the first camera and the at least one of the N second cameras are placed along the same optical axis, the first image and at least one N second image would capture a common region of the real-world environment. Since the first camera has the wide field of view, the first image would also represent another region of the real-world environment that is not represented in the at least one N second image (as the another region is not imaged by the at least one N second camera due to its narrow field of view). The common region of the real-world environment would be captured using at least two different focal lengths (of the first camera and the at least one N second camera), eliminating the requirement for auto focus in the imaging system.

Optionally, the N second cameras are arranged to have an overlap in their corresponding fields of view, wherein an extent of overlap between fields of view of any two adjacent second cameras lies in a range of 30-50% of a field of view of a given second camera. The corresponding fields of views of the N second cameras are made to overlap by the arrangement of the N second cameras, in order to capture additional visual information regarding a common region of the real-world environment that corresponds to the overlap, as compared to visual information which would have been captured without the overlap. Second images captured by the two adjacent second cameras (whose fields of view have the overlap) have overlapping portions that represent the common region corresponding to the overlap. These overlapping portions are beneficially utilized when generating the output image, to provide super resolution in a corresponding portion of the output image.

It will be appreciated that when the overlap of the fields of views of any two adjacent second cameras optionally lies between 30-50% of the field of view of the given second camera, a maximum disparity between the two adjacent second cameras would not be more than 70%. In particular, the maximum disparity would lie in a range of 50-70%. This means that even when the two adjacent second cameras are placed at a farthest distance from each other, each second camera would still capture at least 30% of what the other second camera captures. A portion of the output image corresponding to the overlap between the fields of view of any two adjacent second cameras would have a higher resolution as compared to a resolution of a corresponding overlapping portion of a given second image captured by the given second camera.

Optionally, the extent of overlap between the fields of view of any two adjacent second cameras lies in a range of 30-50% of the field of view of the given second camera. For example, the extent of overlap between the fields of view of any two adjacent second cameras may be from 30, 35, 40 or 45% up to 40, 45 or 50% of the field of view of the given second camera. Other percentages of the given angle of overlap that lie within and outside the aforesaid range are also feasible.

The at least one processor is coupled to the first camera and the N second cameras. It will be appreciated that the at least one processor controls the overall operation of the imaging system. Additionally, the processor may be coupled to other components of the imaging system.

The second field of view of the given second camera is equivalent to the second field of view captured in the given second image, and the first field of view of the first camera is equivalent to the first field of view captured in the first image. The second field of view captured in a given second image is narrower than the first field of view captured in the first image, since the first camera is a wide-angle camera which captures a wider field of view compared to the N second cameras which are narrow-angle cameras. Depending on the arrangement of the first camera and the N second cameras, the second field of view captured by the given second camera overlaps with the portion of the first field of view. Herein, the first camera and the N second cameras capture the first image and the N second images, respectively, of the real-world environment simultaneously, in order to capture visual information of the real-world environment at a same instant of time.

It will be appreciated that real-world environments can often be dynamic, and objects in the real-world environments may keep changing their state, position, and the like, within fractions of seconds. Capturing of the first image and the N second images at the same instant of time provides cohesive temporal visual information for the same instant of time. The first camera and the N second cameras are controlled in this manner by the at least one processor, to beneficially reduce temporal disparity in the visual information, and enables the output image to be subsequently generated with high quality.

Optionally, the first field of view has an angular width that lies in a range of 60-220 degrees, and the second field of view has an angular width that lies in a range of 5-45 degrees. The term "angular width" refers to an angular extent, the angular extent being measured in terms of degrees, radians, or similar. The first field of view has a much wider angular extent as compared to the second field of view. For example, the angular width of the first field of view may be from 60, 75, 90, 120, 150 or 180 degrees up to 75, 90, 120, 150, 180 or 220 degrees. For example, the angular width of the second field of view may be from 5, 10, 15, 25 or 40 degrees up to 15, 20, 25, 35 or 45 degrees. Other values of the angular widths of the first field of view and the second field of view that lie within and outside the aforesaid ranges are also feasible.

Optionally, a resolution of a given second image lies in a range of 95-105% of 1/Nth of 60 pixels per degree. For example, the resolution of the given second image may be from 95, 97.5, 100, 102.5 percent up to 97.5, 100, 102.5 or 105 percent of 1/Nth of 60 pixels per degree (PPD). When the resolution of the given second image lies in the aforesaid range, a resultant resolution that is generated upon overlap of N given second images would be approximately 60 pixels per degree. In other words, N overlapping portions of the N given second images would collectively yield a super resolution of approximately 60 pixels per degree. This super resolution is further enhanced (to be greater than or equal to 60 PPD) when the N overlapping portions of the N given second images overlap with the first image to generate a corresponding portion of the output image. Therefore, this super resolution mimics human-eye resolution and is much higher than the (individual) resolution of the given second image, which is approximately 1/Nth of 60 pixels per degree. The (individual) resolution of the given second image lies within +/−5 percent from 1/Nth of 60 pixels per degree. A technical effect of this is that low-resolution second cameras, which are generally cost-effective and are easily available, may be effectively utilised in the imaging system without compromising on visual quality of the output image, as the N second images would provide the (requisite) super resolution in the output image. As an example, when N is equal to 3, resolutions of three second images could be 20 PPD, 19.4 PPD, and 20.4 PPD. Other percentages of the resolution of the given second image that lie within and outside the aforesaid range are also feasible.

The first image comprises a non-overlapping portion and the plurality of first overlapping portions which overlap with any one of the N second images, the at least one second overlapping portion that overlaps with any two of the N second images, and the third overlapping portion that overlaps with each of the N second images. The non-overlapping portion does not overlap with any of the N second images. The given overlapping portions of the first image are determined based on an expected overlap of the fields of views of the first camera and the N second cameras. This expected overlap can be accurately determined based on a priori knowledge of the arrangement of the first camera and the N second cameras, and the fields of views of the first camera and the N second cameras. Notably, a shape and size of a given overlapping portion depends on an extent and arrangement of overlap between the first image and the N second images.

Optionally, when the imaging system comprises the first camera and two second cameras, the first image comprises two first overlapping portions, one second overlapping portion, and one non-overlapping portion. In such a case, the one second overlapping portion also represents the third overlapping portion since it overlaps with each of two second images captured by the two second cameras. One such exemplary first image has been illustrated in conjunction with FIG. 4B.

A given overlapping portion of the first image overlaps with at least one of the N second images since the field of view of the first camera is wider than the fields of views of the N second cameras. Optionally, for the given overlapping portion of the first image, the overlapping portion of at least one of the N second images is determined by: identifying a position of the given overlapping portion of the first image within the field of view of the first camera; mapping the field of view of the first camera with the field of view of the at least one of the N second cameras; and identify a portion of the at least one of the N second images that corresponds to the given overlapping portion of the first image as the overlapping portion of the at least one of the N second images that overlaps with the given overlapping portion of the first image. Notably, the at least one processor is configured to perform the aforesaid processing operations.

The given overlapping portion of the first image and the overlapping portion of the at least one of the N second images are processed by utilising super resolution techniques. Throughout the present disclosure, the term "super resolution techniques" being utilized by the at least one processor refers to image processing techniques which combine different images having different resolutions to generate the output image in a manner that a resolution of the output image is higher than any of the different resolutions. In this way, the output image is said to have a "super resolution". A resolution of a given image is indicative of a level of visual detail represented in the given image. The resolution of the given image may be expressed in terms of pixels per degree, points per degree, or similar. A high resolution of the given image is indicative of a high level of visual detail, and thus a high visual quality of the given image.

The at least one processor provides the super resolution in the output image, wherein the super resolution is much higher than an original resolution of the first image and the N second images. Therefore, the at least one processor digitally processes the first image and the N second images (which have low resolutions) to generate the output image (which has a high spatially variable resolution). In such a case, the resolution of the output image is limited by (original) resolutions of the first image and the N second images. As the first image and the N second images overlap, the given overlapping portion of the first image is processed by utilising the super resolution techniques as it overlaps with the overlapping portion of the at least one of the N second images, thereby providing the corresponding portion of the output image, wherein the corresponding portion has a super resolution.

The term "output image" refers to an image generated as an output by the imaging system. Optionally, the at least one processor is configured to send the output image to the display apparatus, for displaying at the display apparatus. Such output images having the super resolution are beneficially utilized at the display apparatus, since the display apparatus requires high-resolution images for providing realism and immersion within XR environments.

The output image comprises a plurality of portions (such as a portion corresponding to the non-overlapping portion of the first image and portions which correspond to overlap of given overlapping portions of the first image and at least one of the N second images). A resolution of the portion of the output image which corresponds to the non-overlapping portion of the first image is same as the resolution of the non-overlapping portion in the first image. The portions of the output image which correspond to overlap of the overlapping portions of the first image and at least one of the N second images have super resolution (corresponding to the resolutions of the overlapping portions of the first image and at least one of the N second images).

Optionally, the resolution of the output image varies spatially across the plurality of portions of the output image in a manner that:
  a resolution of a third portion of the output image corresponding to an overlap of the third overlapping portion of the first image with each of the N second images is higher than a resolution of a second portion of the output image corresponding to an overlap of the at least one second overlapping portion of the first image with any two of the N second images,
  the resolution of the second portion is higher than a resolution of a first portion of the output image corresponding to an overlap of the plurality of first overlapping portions of the first image with any one of the N second images, and
  the resolution of the first portion is higher than a resolution of a remaining portion of the output image corresponding to the non-overlapping portion of the first image.

Optionally, in this regard, the resolution of the third portion of the output image lies in a range of 60 to 90 pixels per degree, the resolution of the second portion of the output image lies in a range of 40 to 70 pixels per degree, the resolution of the first portion of the output image lies in a range of 25 to 55 pixels per degree, and the resolution of the remaining portion of the output image lies in a range of 10 to 40 pixels per degree. As an example, the resolution of the third portion of the output image may be from 60, 65, 70, 75, 80 or 85 PPD up to 65, 70, 75, 80, 85 or 90 PPD; the resolution of the second portion of the output image may be from 40, 45, 50, 55, 60 or 65 PPD up to 45, 50, 55, 60, 65 or 70 PPD; the resolution of the first portion of the output image may be from 25, 30, 35, 40, 45 or 50 PPD up to 30, 35, 40, 45, 50 or 55 PPD; and the resolution of the remaining portion of the output image may be from 10, 15, 20, 25, 30 or 35 PPD up to 15, 20, 25, 30, 35 or 40 PPD. Other values of resolution that lie within and outside the aforesaid ranges may also be feasible.

Optionally, when processing the given overlapping portion of the first image and the overlapping portion of the at least one of the N second images, the at least one processor is configured to:

determine an overlapping portion of at least one other of the N second images that overlaps with the given overlapping portion of the first image and the overlapping portion of the at least one of the N second images;

generate a corresponding portion of an intermediate image from the overlapping portion of the at least one of the N second images and the overlapping portion of the at least one other of the N second images; and fuse the given overlapping portion of the first image and the corresponding portion of the intermediate image to generate the corresponding portion of the output image.

In this regard, the overlapping portion of the at least one other of the N second images is determined by mapping a field of view of at least one second camera that is used to capture the at least one other of the N second images with fields of view of the first camera and at least one second camera that is used to capture the at least one of the N second images. Next, the corresponding portion of the intermediate image is generated from the overlapping portion of the at least one of the N second images and the overlapping portion of the at least one other of the N second images by utilising super resolution techniques. Herein, the term "intermediate image" refers to an image that is generated upon combining two or more second images.

Optionally, the given overlapping portion of the first image is fused with the corresponding portion of the intermediate image to generate the corresponding portion of the output image, by utilising image fusion techniques. Throughout the present disclosure, the term "image fusion techniques" refers to image processing techniques which fuse visual information from multiple images to form one resultant image (such as the output image) having a resolution that is higher than original resolution of any of the multiple images. Generally, three levels of image fusion are employed in the image fusion techniques, such as pixel level fusion, feature level fusion and decision-making level fusion. Examples of the image fusion techniques include, but are not limited to, a multi-scale decomposition fusion technique, a Laplacian pyramid fusion technique, a discrete wavelet-based fusion technique, and a multi-focus fusion technique.

Optionally, when processing the given overlapping portion of the first image and the overlapping portion of the at least one of the N second images, the at least one processor is configured to blend the corresponding portion of the output image with an adjacent portion of the output image. Optionally in this regard, the at least one processor is configured to employ an image blending algorithm. Examples of the image blending algorithms include a Poisson and modified Poisson blending algorithm, a gradient-based blending algorithm, Multiband blending (for example, such as Laplacian pyramid blending), Mean-value coordinates (MVC) blending, Multi-spline blending, Feather blending algorithm, and the like. Image blending algorithms are well-known in the art. It will be appreciated that since the corresponding portion of the output image is generated in the aforesaid manner, the resolution of the output image changes abruptly spatially throughout different portions of the output image. This abrupt variation in resolutions of different portions of the output image is introduced due to different numbers of second images being combined with the first image to yield the different portions of the output image. Such an abrupt variation of resolution within the output image would make the output image seem artificial as these variations would be easily perceptible to the user, and would not provide immersive human-eye resolution in the output image. Therefore, the at least one processor optionally blends the corresponding portion of the output image with the adjacent portion of the output image by utilising blending techniques, in order to provide a gradual change in resolution across the output image. As a result, the output image emulates realistic human eye resolution.

Optionally, prior to processing the given overlapping portion of the first image and the overlapping portion of the at least one of the N second images, the at least one processor is configured to apply at least one image processing algorithm to at least one of: the first image, the N second images. Optionally, in this regard, the at least one image processing algorithm is at least one of: an image de-blurring algorithm, a single image super-resolution algorithm, an image sharpening algorithm, an image enhancement algorithm, a motion blur removal algorithm. The at least one image de-blurring algorithm may, for example, be a blind deconvolution-based de-blurring algorithm, a wavelet method-based de-blurring algorithm, a Lucy-Richardson method-based de-blurring algorithm, or similar. The image sharpening algorithm may, for example, be an unsharp mask-based algorithm. The image enhancement algorithm may, for example, be an edge preserving filtering-based algorithm. Other types and examples of the at least one image processing algorithm are also feasible. Such image processing algorithms are well-known in the art.

Optionally, the N second cameras are arranged to have a common overlapping portion between each of the N second cameras. In this regard, the N second cameras are arranged such that the corresponding fields of views of the N second cameras overlap to have the common overlapping portion therebetween. Subsequently, a common region of the real-world environment corresponding to the common overlapping portion, gets captured by each of the N second cameras. This enables in providing highest super resolution in a corresponding portion of the output image that is generated using overlapping portions of the N second images (that represent the common overlapping portion) and the third overlapping portion of the first image. The capture of comprehensive visual information of the common overlapping portion represented in the corresponding portion of the output image, using the N second cameras along with the first camera, yields the highest super resolution in the output image.

Optionally, the at least one processor is configured to control a tilt of a given second camera in a manner that an angular width of the common overlapping portion is greater than a predefined angular width. The term "angular width" refers to an angular extent, and is expressed in terms of degrees, radians, or similar. The common overlapping portion has a certain angular width since the fields of views of the N second cameras overlap partially to have the common overlapping portion. The angular width of the common overlapping portion may be expressed in terms of an entirety of the common overlapping portion, or in terms of an angular separation between a centre of the common overlapping portion and a periphery of the common overlapping portion.

Optionally, the angular width of the common overlapping portion lies in a range of 5-30 degrees. For example, the angular width may be from 5, 7.5, 10, 12.5, 15, 20 or 25 degrees up to 10, 15, 20, 25 or 30 degrees. Other values of the angular width that lie within and outside the aforesaid range are also feasible. As an example, if the angular width of the common overlapping portion is 30 degrees between the centre of the common overlapping portion and the periphery of the common overlapping portion, then the angular width of the entirety of the common overlapping portion is 60 degrees.

It will be appreciated that the angular width of the common overlapping portion defines a size of the common overlapping portion, therefore, when the angular width of the common overlapping portion is optionally greater than the predefined angular width, it is ensured that the common overlapping portion is larger than a predefined threshold size. If the common overlapping portion is too small (i.e., smaller than the predefined angular width), a corresponding portion of the output image would be too small, which is undesirable. The common overlapping portion is represented at super resolution in the corresponding portion of the output image for emulating human eye resolution in the output image. When the output image is viewed by the user, a high visual detail is experienced resulting in a good viewing experience.

Optionally, the imaging system further comprises N actuators associated with each of the N second cameras. A given actuator is driven using an actuation signal to control the tilt of a given second camera that is associated with the given actuator. Herein, the term "actuator" refers to an equipment that is employed to rotate, tilt and/or shift a component with which it is associated. A given actuator may, for example, include electrical components, mechanical components, magnetic components, polymeric components and so forth. The given actuator is driven by the actuation signal, which could be a piezoelectric force, an electromagnetic force, a mechanical torque, an electric current, a hydraulic pressure, a pneumatic pressure or similar. The given second camera is tilted in order to capture the common overlapping portion within its corresponding field of view. By controlling the tilt of the given second camera, the corresponding field of view can be made to include the common region of the real-world environment.

Optionally, the at least one processor is configured to:
receive, from a display apparatus, information indicative of a gaze direction of a user;
determine, based on the gaze direction, a gaze point in the first field of view captured in the first image; and
control the tilt of the given second camera in a manner that the common overlapping portion includes and surrounds the gaze point.

Optionally, the display apparatus comprises gaze-tracking means for tracking the gaze direction of the user, wherein the gaze-tracking means is communicably coupled to the at least one processor. The term "gaze-tracking means" refers to a specialized equipment for detecting and/or following the gaze of the user, when the display apparatus in operation is worn by the user. The gaze-tracking system could be implemented as contact lenses with sensors, cameras monitoring a position of a pupil of the user's eye, and the like. Such gaze-tracking means are well-known in the art. The gaze-tracking means are configured to collect gaze-tracking data, which constitutes the information indicative of the gaze direction of the user. Then, the gaze-tracking means sends the gaze-tracking data (i.e., said information) to the at least one processor. It will be appreciated that the gaze-tracking data is collected repeatedly by the gaze-tracking means throughout a given session of using the display apparatus, as gaze of the user's eyes keeps changing whilst he/she uses the display apparatus. An up-to-date gaze-tracking data (indicative of the gaze direction of the user) allows for producing an up-to-date gaze-contingent output image. This output image is to be displayed at the display apparatus.

Optionally, the tilt of the given second camera is controlled in order to capture the common overlapping portion within its field of view. By controlling the tilt of the given second camera, the corresponding field of view can be made to include the gaze point. Since the gaze point is the point where the user's gaze is focusing, the N second cameras are controlled to be tilted such that the common overlapping portion includes and surrounds the gaze point. When the common overlapping portion includes and surrounds the gaze point, the gaze point and its surrounding region is represented at super resolution in the output image, which improves the viewing experience of the user by providing the output image which is realistic in accordance with human eye resolution.

Optionally, the at least one processor is configured to crop a given second image to include the common overlapping portion. Typically, a size of an image sensor pixel array of a given second camera is quite large as compared to a size of an image sensor that can be readout and cropped at a high rate (for example, such as 90 frames per second). The given second image is optionally cropped, in order to increase resolution towards the common overlapping area of all the N second cameras. When the given second image is cropped to include the common overlapping portion, and the given second image is utilised to generate the output image, the common overlapping portion represented in the given second image is processed to provide super resolution to the portion of the output image corresponding to the common overlapping portion. Additionally, a central axis of a field of view captured in a cropped portion of the given second image forms an angle with respect to the optical axis of the first camera which is lower than the predefined threshold angle with respect to the optical axis of the first camera. This angle being less than the predefined angle aligns the fields of views of the N second cameras with the field of view of the first camera. Such an arrangement reduces the disparity between the (cropped) N second images and the first image, such that the common overlapping portion is captured from a nearly similar perspective in these images.

It will be appreciated that in some implementations, an arrangement of the common overlapping portion with respect to the first field of view captured in the first image may be fixed. In other implementations, an arrangement of the common overlapping portion with respect to the first field of view captured in the first image may be dynamic, the position being determined based on the gaze direction in a manner that the common overlapping portion includes and surrounds the gaze point.

In an embodiment, the at least one processor is configured to:
receive, from a display apparatus, information indicative of a gaze direction of a user;
determine, based on the gaze direction, a gaze point in the first field of view captured in the first image; and
determine a sub-portion of the overlapping portion of the at least one of the N second images that lies outside a circle having the gaze point as its centre and a predefined threshold distance as its radius,
wherein, when processing the given overlapping portion of the first image and the overlapping portion of the at least one of the N second images, the at least one processor is configured to process only a remaining sub-portion of the overlapping portion of the at least one of the N second images with the given overlapping portion of the first image to generate the corresponding portion of the output image.

Optionally, the predefined threshold distance defines a size of the circle, the circle serving as a region of interest surrounding the gaze point. The sub-portion and the remaining sub-portion of the overlapping portion of the at least one of the N second images are determined based on the size of the circle. Since the sub-portion of the overlapping portion of the at least one of the N second images lies outside the circle, the sub-portion is away from the gaze point and need not be utilized when generating the corresponding portion of the output image since the user is not focusing on the sub-portion. However, the remaining sub-portion of the overlapping portion lies within the circle and would be utilized when generating the corresponding portion of the output image since the user is focusing on the remaining sub-portion. Therefore, the at least one processor utilizes only the remaining sub-portion to generate the corresponding portion of the output image. The technical effect of this lies in saving processing resources of the at least one processor by judiciously utilizing only requisite processing resources, thereby ultimately reducing a latency of the imaging system.

In another embodiment, the at least one processor is configured to:
  receive, from a display apparatus, information indicative of a gaze direction of a user;
  determine, based on the gaze direction, a gaze point in the first field of view captured in the first image;
  determine a sub-portion of the overlapping portion of the at least one of the N second images that lies outside a circle having the gaze point as its centre and a predefined threshold distance as its radius; and
  receive only a remaining sub-portion of the overlapping portion of the at least one of the N second images from a corresponding second camera,
  wherein, when processing the given overlapping portion of the first image and the overlapping portion of the at least one of the N second images, the at least one processor is configured to process only the remaining sub-portion of the overlapping portion of the at least one of the N second images with the given overlapping portion of the first image to generate the corresponding portion of the output image.

In this regard, since the remaining sub-portion is in proximity to the gaze point and only the remaining portion is to be utilized to generate the corresponding portion of the output image (as described hereinabove), the at least one processor receives only the remaining sub-portion of the overlapping portion of the at least one of the N second images. The technical effect of this is that there is a reduction in an amount of data exchanged between the N second cameras and the at least one processor, which further reduces a processing burden on the at least one processor and ultimately makes the imaging system faster.

It will be appreciated that the predefined threshold distance can be measured in degrees or radians, or as a number of pixels. Optionally, the predefined threshold distance lies in a range of 5-45 degrees. For example, the predefined threshold distance may be from 5, 10, 15, 20, 25, 30 or 35 degrees up to 10, 15, 20, 25, 30, 35, 40 or 45 degrees. Other values of the given predefined threshold distance that lie within and outside the aforesaid range are also feasible.

The present disclosure also relates to the display apparatus as described above. Various embodiments and variants disclosed above, with respect to the aforementioned first aspect, apply mutatis mutandis to the display apparatus.

Throughout the present disclosure, the term "light source" refers to an element from which light emanates. The light source is driven to display the output image produced by the imaging system. Optionally, a given light source is implemented as a display. In this regard, the output image is displayed at the display. Examples of such a display include, but are not limited to, a Liquid Crystal Display (LCD), a Light-Emitting Diode (LED)-based display, an Organic LED (OLED)-based display, a micro OLED-based display, an Active Matrix OLED (AMOLED)-based display, and a Liquid Crystal on Silicon (LCoS)-based display. Alternatively, optionally, a given light source is implemented as a projector. In this regard, the output image is projected onto a projection screen or directly onto a retina of the user's eyes. Examples of such a projector include, but are not limited to, an LCD-based projector, an LED-based projector, an OLED-based projector, an LCoS-based projector, a Digital Light Processing (DLP)-based projector, and a laser projector.

Optionally, the given light source is a multi-resolution light source, or a single-resolution light source. The multi-resolution light source is configured to display the output image at two or more display resolutions, whereas the single-resolution light source is configured to display the output image at a single display resolution (namely, a uniform display resolution) only. The term "display resolution" of the given light source refers to a total number of pixels in each dimension of the given light source, or to a pixel density (namely, the number of pixels per unit distance or area) of the given light source.

Optionally, prior to displaying, the at least one processor is configured to superimpose virtual content upon the output image. The virtual content is computer-generated content. The virtual content may comprise at least one virtual object. Examples of the at least one virtual object may include, but are not limited to, a virtual navigation tool (such as a virtual map, a virtual direction signage, and so forth), a virtual gadget (such as a virtual calculator, a virtual computer, and so forth), a virtual message (such as a virtual instant message, a virtual chat conversation, a virtual to-do note, and so forth), a virtual entity (such as a virtual person, a virtual animal, a virtual ghost, and so forth), a virtual entertainment media (such as a virtual painting, a virtual video, a virtual interactive advertisement, and so forth), a virtual vehicle or part thereof (such as a virtual car, a virtual cockpit, and so forth), and a virtual information (such as a virtual news description, a virtual announcement, virtual data, and so forth).

Optionally, in the display apparatus, the N second cameras are arranged at vertices of an equilateral polygon having N sides.

Optionally, in the display apparatus, the N second cameras are arranged to have a common overlapping portion between each of the N second cameras.

Optionally, in the display apparatus, the at least one processor is configured to control a tilt of a given second camera in a manner that an angular width of the common overlapping portion is greater than a predefined angular width.

Optionally, the display apparatus further comprises gaze-tracking means, wherein the at least one processor is configured to:
  process gaze-tracking data obtained from the gaze-tracking means to determine a gaze direction of a user;
  determine, based on the gaze direction, a gaze point in the first field of view captured in the first image; and
  control the tilt of the given second camera in a manner that the common overlapping portion includes and surrounds the gaze point.

Optionally, the display apparatus further comprises gaze-tracking means, wherein the at least one processor is configured to:

process gaze-tracking data obtained from the gaze-tracking means to determine a gaze direction of a user;

determine, based on the gaze direction, a gaze point in the first field of view captured in the first image; and determine a sub-portion of the overlapping portion of the at least one of the N second images that lies outside a circle having the gaze point as its centre and a predefined threshold distance as its radius, wherein, when processing the given overlapping portion of the first image and the overlapping portion of the at least one of the N second images, the at least one processor is configured to process only a remaining sub-portion of the overlapping portion of the at least one of the N second images with the given overlapping portion of the first image to generate the corresponding portion of the output image.

Optionally, the display apparatus further comprises gaze-tracking means, wherein the at least one processor is configured to:

process gaze-tracking data obtained from the gaze-tracking means to determine a gaze direction of a user;

determine, based on the gaze direction, a gaze point in the first field of view captured in the first image;

determine a sub-portion of the overlapping portion of the at least one of the N second images that lies outside a circle having the gaze point as its centre and a predefined threshold distance as its radius; and receive only a remaining sub-portion of the overlapping portion of the at least one of the N second images from a corresponding second camera, wherein, when processing the given overlapping portion of the first image and the overlapping portion of the at least one of the N second images, the at least one processor is configured to process only the remaining sub-portion of the overlapping portion of the at least one of the N second images with the given overlapping portion of the first image to generate the corresponding portion of the output image.

Optionally, in the display apparatus, when processing the given overlapping portion of the first image and the overlapping portion of the at least one of the N second images, the at least one processor is configured to:

determine an overlapping portion of at least one other of the N second images that overlaps with the given overlapping portion of the first image and the overlapping portion of the at least one of the N second images;

generate a corresponding portion of an intermediate image from the overlapping portion of the at least one of the N second images and the overlapping portion of the at least one other of the N second images; and fuse the given overlapping portion of the first image and the corresponding portion of the intermediate image to generate the corresponding portion of the output image.

Optionally, in the display apparatus, when processing the given overlapping portion of the first image and the overlapping portion of the at least one of the N second images, the at least one processor is configured to blend the corresponding portion of the output image with an adjacent portion of the output image.

DETAILED DESCRIPTION OF THE DRAWINGS

Referring to FIG. 1, illustrated is a block diagram of an architecture of an imaging system 100, in accordance with an embodiment of the present disclosure. The imaging system 100 comprises a first camera 102, N second cameras (depicted as second cameras 104A, 104B, . . . , 104N, which can be collectively referenced as 104 for sake of simplicity), and at least one processor (depicted as a processor 106). The processor 106 is communicably coupled to the first camera 102 and the N second cameras 104.

Figure 2:
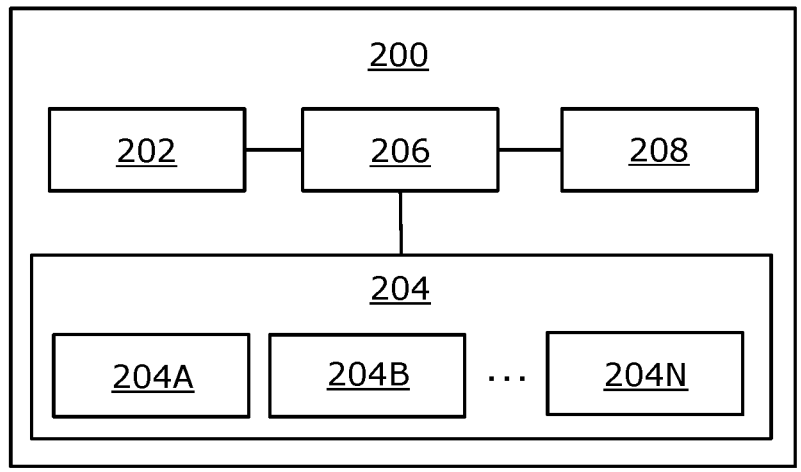
FIG. 2 illustrates a block diagram of an architecture of a display apparatus, in accordance with an embodiment of the present disclosure.

Referring to FIG. 2, illustrated is a block diagram of an architecture of a display apparatus 200, in accordance with an embodiment of the present disclosure. The display apparatus 200 comprises a first camera 202 per eye, N second cameras (depicted as second cameras 204A, 204B, . . . , 204N which can be collectively referenced as 204 for sake of simplicity) per eye, at least one processor (depicted as a processor 206), and at least one light source (depicted as a light source 208) per eye. The processor 206 is communicably coupled to the first camera 202, the N second cameras 204, and the light source 208.

Figure 3:
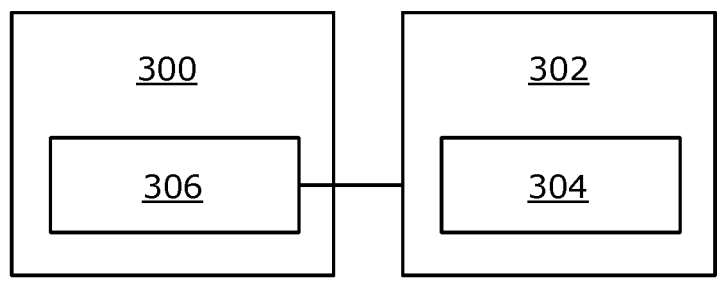
FIG. 3 illustrates a block diagram of an exemplary scenario of using an imaging system in conjunction with a display apparatus, in accordance with an embodiment of the present disclosure.

Referring to FIG. 3, illustrated is a block diagram of an exemplary scenario of using an imaging system 300 in conjunction with a display apparatus 302, in accordance with an embodiment of the present disclosure. The display apparatus 302 is shown to comprise gaze-tracking means 304. A processor 306 of the imaging system 300 is communicably coupled to the display apparatus 302.

FIGS. 1, 2 and 3 include simplified architectures of the imaging systems 100 and 300, and the display apparatuses 200 and 302, respectively, for the sake of clarity only, which should not unduly limit the scope of the claims herein. The person skilled in the art will recognize many variations, alternatives, and modifications of embodiments of the present disclosure.

Figure 4A:
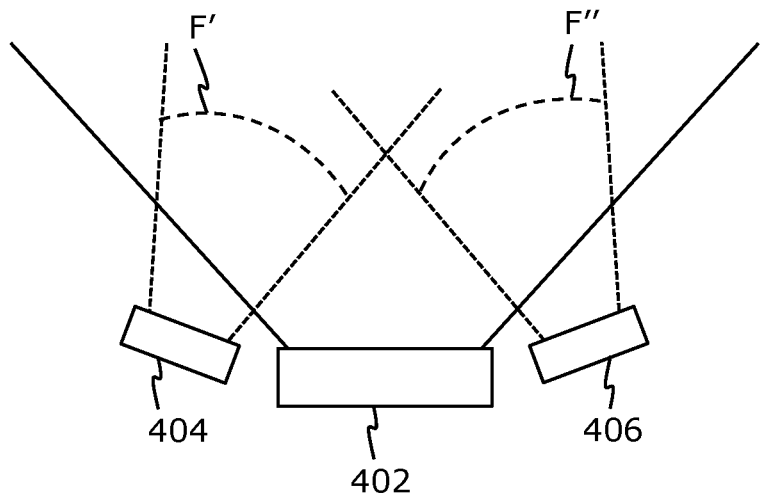
Figure 4B:
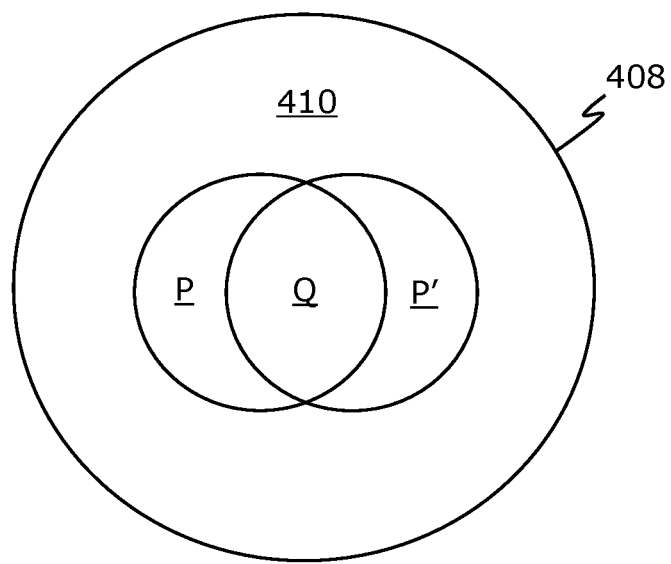
FIG. 4B illustrates a first image captured by the first camera of FIG. 4A, in accordance with an embodiment of the present disclosure.

Referring to FIGS. 4A and 4B, FIG. 4A illustrates an exemplary arrangement of a first camera 402 and two second cameras 404 and 406, while FIG. 4B illustrates a first image 408 captured by the first camera 402 of FIG. 4A, in accordance with an embodiment of the present disclosure.

In FIG. 4A, the two second cameras 404 and 406 are shown to be arranged surrounding the first camera 402. Herein, the two second cameras 404 and 406 are arranged to have an overlap in their corresponding fields of view F' and F".

In FIG. 4B, the first image 408 comprises three overlapping portions P, P', and Q that overlap with at least one of two second images (not shown) that are captured by the two second cameras 404 and 406. First overlapping portions P and P' overlap with any one of the two second images. Second overlapping portion Q overlaps with each of the two second images. The first image 408 also comprises a non-overlapping portion 410, which does not overlap with any of the two second images.

FIGS. 4A and 4B include simplified arrangements of the first camera 402 and the two second cameras 404 and 406, and an exemplary illustration of the first image 408, for the sake of clarity only, which should not unduly limit the scope of the claims herein. The person skilled in the art will recognize many variations, alternatives, and modifications of embodiments of the present disclosure.

Figure 5A:
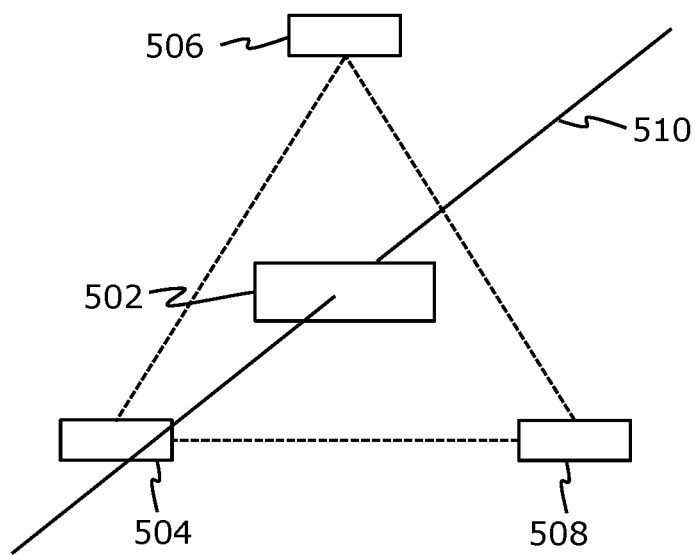
Figure 5B:
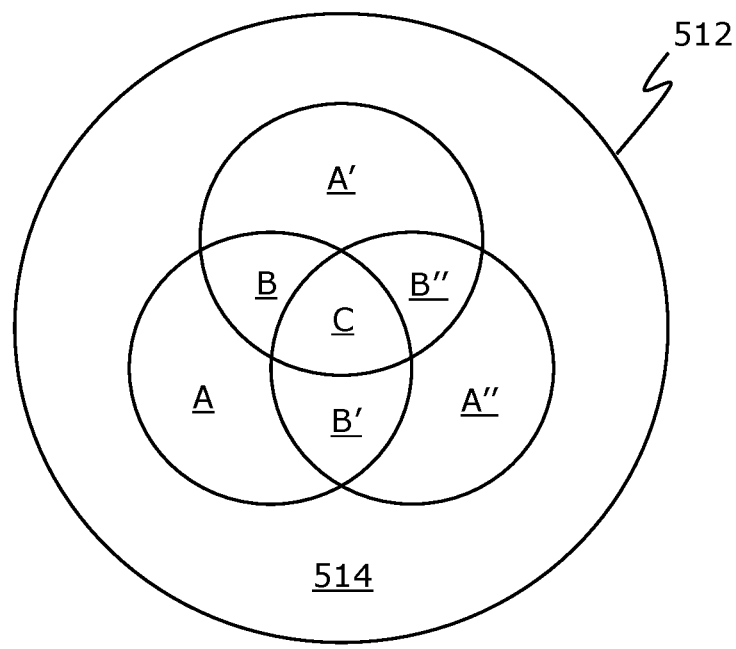
FIG. 5B illustrates a first image captured by the first camera of FIG. 5A, in accordance with another embodiment of the present disclosure.

Referring to FIGS. 5A and 5B, FIG. 5A illustrates an exemplary arrangement of a first camera 502 and three second cameras 504, 506, and 508 with respect to an optical axis 510 of the first camera 502, while FIG. 5B illustrates a first image 512 captured by the first camera 502 of FIG. 5A, in accordance with another embodiment of the present disclosure.

In FIG. 5A, the three second cameras 504, 506, and 508 are shown to be arranged on vertices of an equilateral triangle having three sides. Herein, an optical axis 510 of the first camera 502 is perpendicular to the equilateral triangle, and specifically, to the arrangement of the three second cameras 504, 506, and 508. In such an arrangement, the three second cameras 504, 506, and 508 have an overlap in their corresponding fields of view (not shown).

In FIG. 5B, the first image 512 comprises seven overlapping portions A, A', A", B, B', B" and C that overlap with at least one of three second images (not shown) that are captured by the three second cameras 504, 506, and 508. First overlapping portions A, A', and A" overlap with any one of the three second images. Second overlapping portions B, B', and B" overlap with any two of the three second images. The overlapping portion C overlaps with each of the three second images. The first image 512 also comprises a non-overlapping portion 514, which does not overlap with any of the three second images.

FIGS. 5A and 5B include simplified arrangements of the first camera 502 and the three second cameras 504, 506 and 508 with respect to the optical axis 510, and an exemplary illustration of the first image 512, for the sake of clarity only, which should not unduly limit the scope of the claims herein. The person skilled in the art will recognize many variations, alternatives, and modifications of embodiments of the present disclosure.

Referring to FIGS. 6A, 6B, 6C, and 6D, illustrated are exemplary arrangements of a first camera 602 and a plurality of second cameras, in accordance with various embodiments of the present disclosure.

Figure 6A:
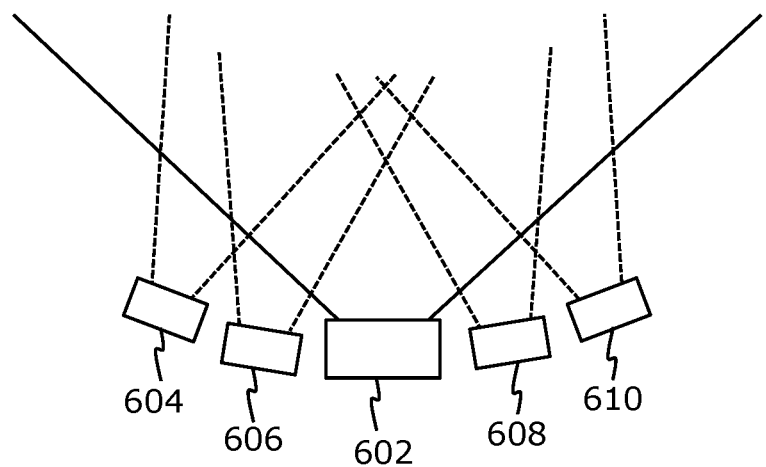
FIGS. 6A, 6B, 6C and 6D illustrate exemplary arrangements of a first camera and a plurality of second cameras, in accordance with various embodiments of the present disclosure.

In FIG. 6A, four second cameras 604, 606, 608, and 610 are shown to be arranged in proximity to and surrounding the first camera 602.

Figure 6B:
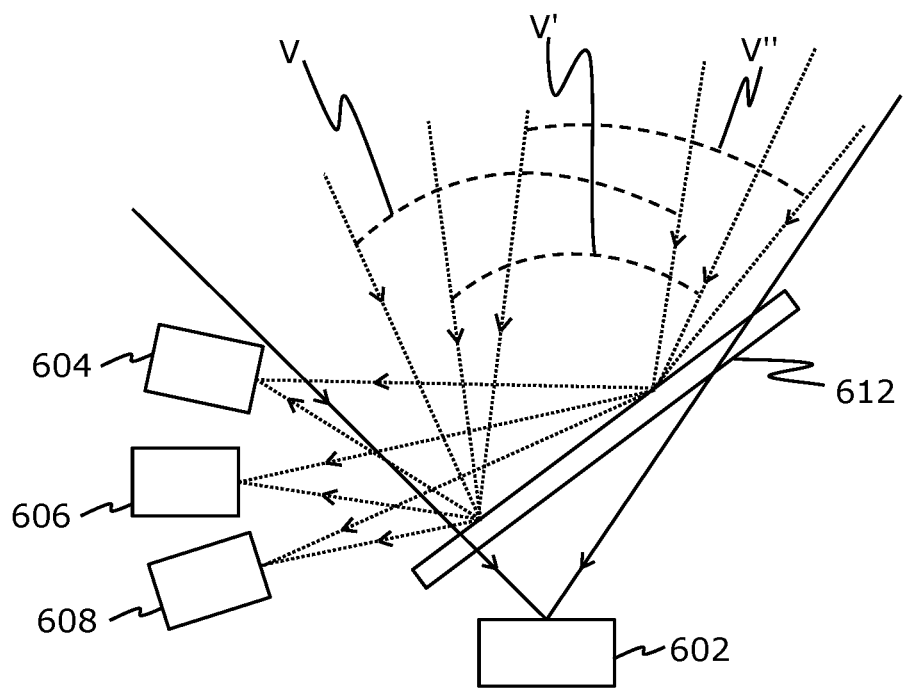
Figure 6C:
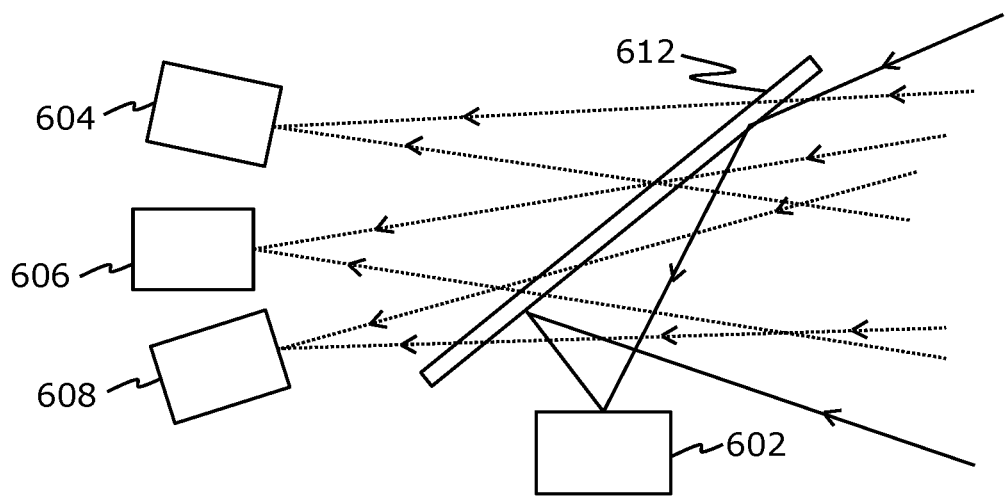

In FIGS. 6B and 6C, the exemplary arrangement of the first camera 602 and three second cameras 604, 606, and 608 is shown. There is also shown a semi-transparent reflective element 612. In FIG. 6B, the semi-transparent reflective element 612 is arranged in a manner that a portion of light emanating from a real-world environment passes through the semi-transparent reflective element 612 towards the first camera 602, whilst a remaining portion of the light is reflected from the semi-transparent reflective element 612 towards the three second cameras 604, 606, and 608. Herein, the three second cameras 604, 606, and 608 are illustrated with their corresponding fields of view V, V', and V", respectively. In FIG. 6C, the semi-transparent reflective element 612 is arranged in a manner that a portion of light emanating from a real-world environment passes through the semi-transparent reflective element 612 towards the three second cameras 604, 606, and 608, and a remaining portion of the light is reflected from the semi-transparent reflective element 612 towards the first camera 602.

Figure 6D:
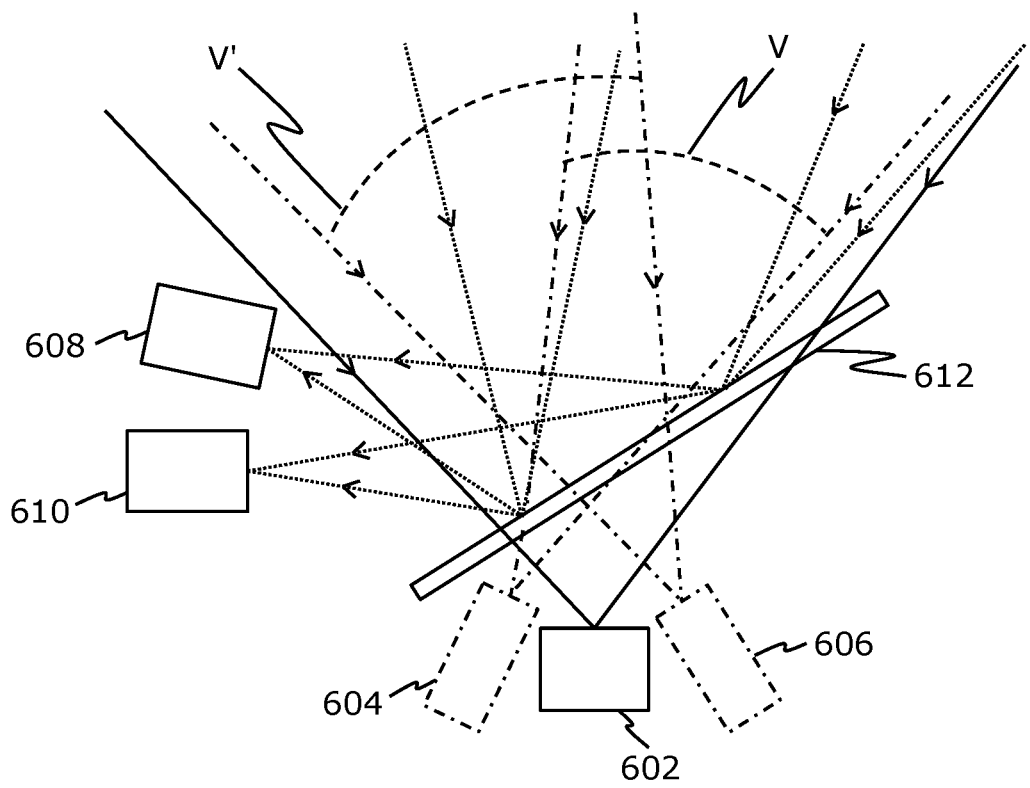

In FIG. 6D, the exemplary arrangement of the first camera 602 and four second cameras 604, 606, 608 and 610 is shown. There is also shown the semi-transparent reflective element 612. The semi-transparent reflective element 612 is arranged in a manner that a portion of light emanating from a real-world environment is passing through the semi-transparent reflective element 612 towards the first camera 602 and the two second cameras 604 and 606 arranged in proximity to the first camera 602, whilst a remaining portion of the light is reflected from the semi-transparent reflective element 612 towards the two second cameras 608 and 610. Herein, the two second cameras 604 and 606 are illustrated with their corresponding fields of view V, and V', respectively.

It may be understood by a person skilled in the art that the exemplary arrangements of FIGS. 6A-6D are merely examples for the sake of clarity, which should not unduly limit the scope of the claims herein. The person skilled in the art will recognize many variations, alternatives, and modifications of embodiments of the present disclosure.

Figure 7A:
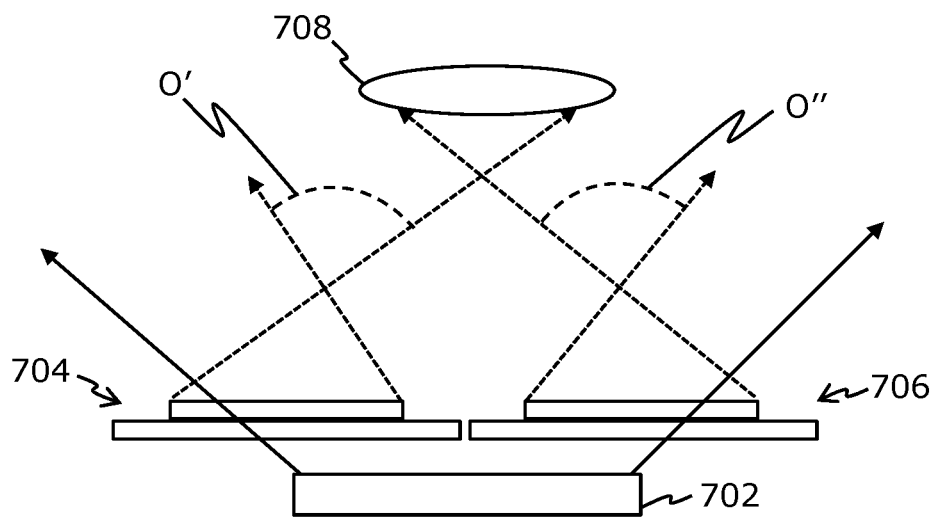
FIG. 7A illustrates an exemplary arrangement of a first camera and two second cameras observing a common overlapping portion.
Figure 7B:
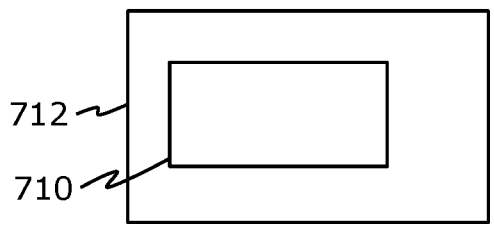
Figure 7C:
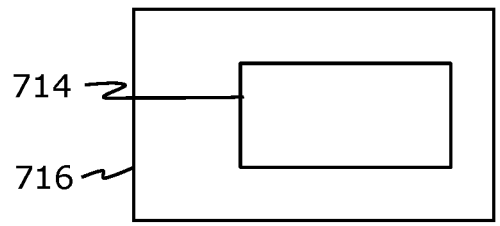
Figure 7D:
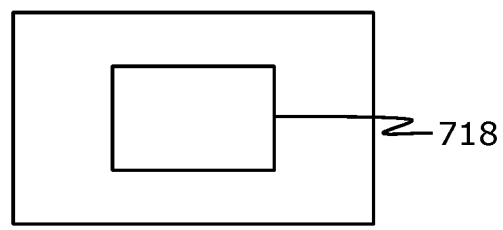
FIG. 7D illustrates cropping of a given second image to include the common overlapping portion, in accordance with an embodiment of the present disclosure.

Referring to FIGS. 7A, 7B, 7C, and 7D, FIG. 7A illustrates an exemplary arrangement of a first camera 702 and two second cameras 704 and 706 observing a common overlapping portion 708, FIGS. 7B and 7C illustrate two second images 710 and 714 captured by the two second cameras 704 and 706 of FIG. 7A, while FIG. 7D illustrates cropping of a given second image to include the common overlapping portion 708, in accordance with an embodiment of the present disclosure.

In FIG. 7A, the two second cameras 704 and 706 are arranged in close proximity to the first camera 702. Herein, the two second cameras 704 and 706 are arranged to have an overlap in their corresponding fields of view O' and O", and have between them the common overlapping portion 708.

In FIG. 7B, a second image 710 is captured at an image sensor 712 of the second camera 704 (depicted in FIG. 7A). In FIG. 7C, a second image 714 is captured at an image sensor 716 of the second camera 706 (depicted in FIG. 7A).

In FIG. 7D, there is shown cropping of a given second image (i.e., any of the second image 710 or the second image 714) to include the common overlapping portion 708. A portion 718 of the given second image that corresponds to the common overlapping portion is cropped from a given image sensor (depicted as a rectangle surrounding the portion 718). For example, when cropping the second image 710, a right portion thereof may be cropped. Alternatively, when cropping the second image 714, a left portion thereof may be cropped.

It may be understood by a person skilled in the art that the FIGS. 7A-7D are merely examples for the sake of clarity, which should not unduly limit the scope of the claims herein. The person skilled in the art will recognize many variations, alternatives, and modifications of embodiments of the present disclosure.

Figure 8A:
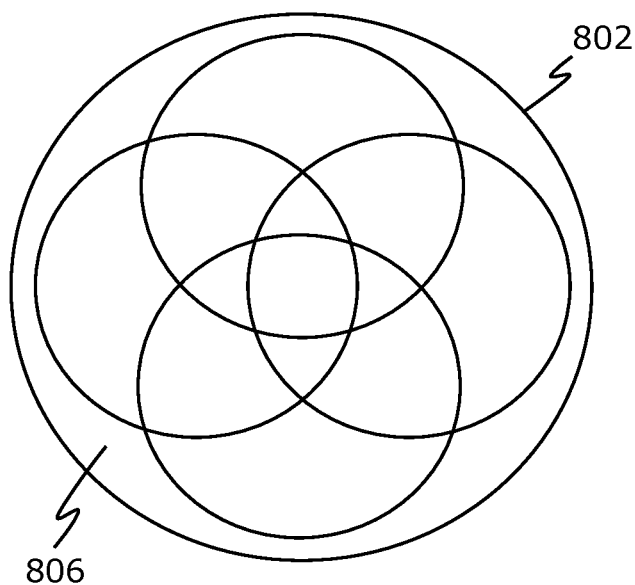
FIGS. 8A and 8B illustrate exemplary first images, in accordance with different embodiments of the present disclosure.
Figure 8B:
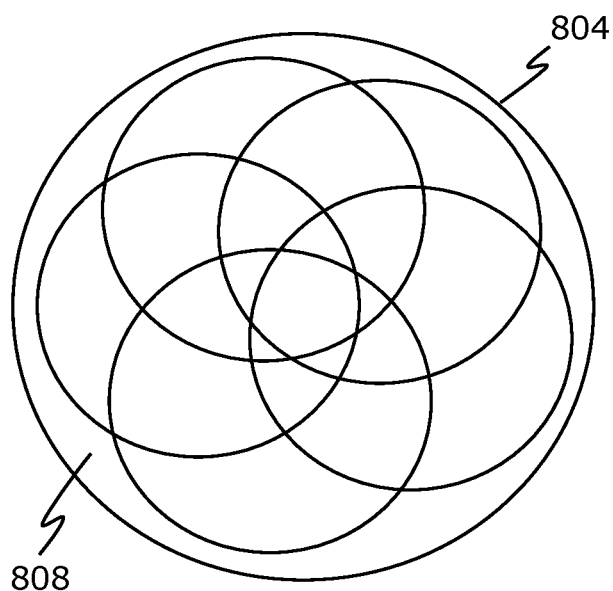

Referring to FIGS. 8A and 8B, illustrated are exemplary first images 802 and 804, in accordance with different embodiments of the present disclosure. In FIG. 8A, the first image 802 is shown to comprise 13 overlapping portions (depicted as 13 regions lying within four interlinked circles) that overlap with at least one of four second images (not shown) that are captured by four second cameras of an imaging system (not shown). The first image 802 is captured by a first camera of the imaging system. The first image 802 is also shown to comprise a non-overlapping portion 806 that does not overlap with any of the four second images. In FIG. 8B, the first image 804 is shown to comprise 21 overlapping portions (depicted as 21 regions lying within five interlinked circles) that overlap with at least one of five second images (not shown) that are captured by five second cameras of an imaging system (not shown). The first image 804 is captured by a first camera of the imaging system. The first image 804 is also shown to comprise a non-overlapping portion 808 that does not overlap with any of the five second images.

It may be understood by a person skilled in the art that the FIGS. 8A and 8B are merely examples for the sake of clarity, which should not unduly limit the scope of the claims herein. The person skilled in the art will recognize many variations, alternatives, and modifications of embodiments of the present disclosure.

Figure 9A:
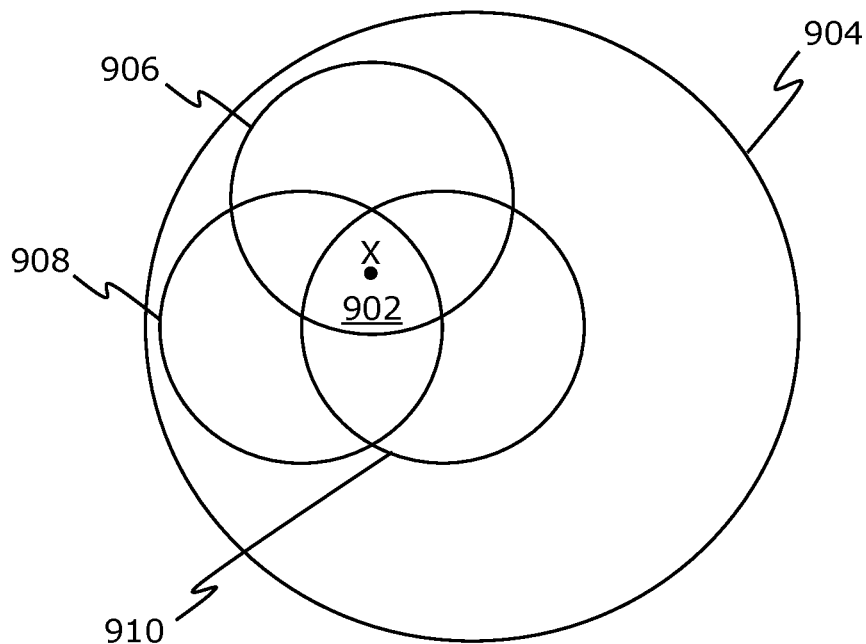
FIGS. 9A and 9B illustrate an arrangement of a common overlapping portion with respect to a first image, in accordance with different embodiments of the present disclosure.
Figure 9B:
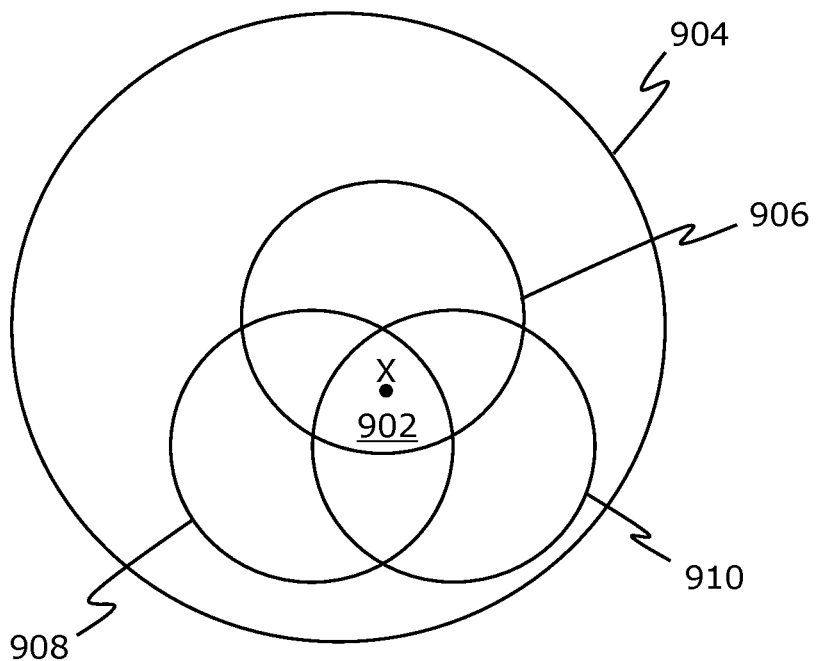

Referring to FIGS. 9A and 9B, illustrated is an arrangement of a common overlapping portion 902 with respect to a first image 904, in accordance with different embodiments of the present disclosure. Three second cameras (not shown) of an imaging system (not shown) may be arranged to have the common overlapping portion 902 between each of the three second cameras. As a result, the common overlapping portion 902 is captured in each of three second images 906, 908, and 910 captured by the three second cameras. Moreover, at least one processor (not shown) of the imaging system is configured to: receive, from a display apparatus (not shown), information indicative of a gaze direction of a user; determine, based on the gaze direction, a gaze point X (depicted as a black dot) in a first field of view captured in the first image 904; and control a tilt of a given second camera in a manner that the common overlapping portion 902 includes and surrounds the gaze point X. Moreover, the at least one processor is also configured to crop a given second image (i.e., the second image 906, 908, or 910) to include the common overlapping portion 902. In FIGS. 9A and 9B, the common overlapping portion 902 is shown to be gaze-contingent with different gaze directions of the user. In FIG. 9A, the gaze direction of the user is along a top left direction, and therefore the common overlapping portion 902 lies towards a top left portion of the first field of view captured in the first image 904. In FIG. 9B, the gaze direction of the user is along a bottom right direction, and therefore the common overlapping portion 902 lies towards a bottom right portion of the first field of view captured in the first image 904.

It may be understood by a person skilled in the art that the FIGS. 9A and 9B are merely examples for the sake of clarity, which should not unduly limit the scope of the claims herein. The person skilled in the art will recognize many variations, alternatives, and modifications of embodiments of the present disclosure.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

What is claimed is:

1. An imaging system comprising:
   a first camera;
   N second cameras, an optical axis of a given second camera being arranged at an angle that is lower than a predefined threshold angle with respect to an optical axis of the first camera; and
   at least one processor configured to:
   control the first camera and the N second cameras to capture simultaneously a first image and N second images of a real-world environment, respectively, wherein a second field of view captured in a given second image is narrower than a first field of view captured in the first image and overlaps with a portion of the first field of view;
   determine a plurality of first overlapping portions of the first image that overlap with any one of the N second images, at least one second overlapping portion of the first image that overlaps with any two of the N second images, and a third overlapping portion of the first image that overlaps with each of the N second images;
   for a given overlapping portion of the first image, determine an overlapping portion of at least one of the N second images that overlaps with the given overlapping portion of the first image; and
   process the given overlapping portion of the first image and the overlapping portion of the at least one of the N second images to generate a corresponding portion of an output image.

2. The imaging system of claim 1, wherein N is a number selected from the group consisting of 2, 3, 4 and 5.

3. The imaging system of claim 1, wherein the N second cameras are arranged at vertices of an equilateral polygon having N sides.

4. The imaging system of claim 1, wherein the N second cameras are arranged surrounding the first camera.

5. The imaging system of claim 1, further comprising a semi-transparent reflective element arranged in a manner that a portion of light emanating from the real-world environment passes through the semi-transparent reflective element towards the first camera, whilst a remaining portion of the light is reflected from the semi-transparent reflective element towards the N second cameras.

6. The imaging system of claim 1, further comprising a semi-transparent reflective element arranged in a manner that a portion of light emanating from the real-world environment passes through the semi-transparent reflective element towards the N second cameras, whilst a remaining portion of the light is reflected from the semi-transparent reflective element towards the first camera.

7. The imaging system of claim 1, wherein at least one of the N second cameras is arranged in a proximity of the first camera, and wherein the imaging system further comprises a semi-transparent reflective element arranged in a manner that a portion of light emanating from the real-world environment passes through the semi-transparent reflective element towards the first camera and the at least one of the N second cameras, whilst a remaining portion of the light is reflected from the semi-transparent reflective element towards a remainder of the N second cameras.

8. The imaging system of claim 1, wherein an optical axis of at least one of the N second cameras is aligned with the optical axis of the first camera.

9. The imaging system of claim 1, wherein the N second cameras are arranged to have an overlap in their corresponding fields of view wherein an extent of overlap between fields of view of any two adjacent second cameras lies in a range of 30-50% of a field of view of a given second camera.

10. The imaging system of claim 1, wherein the N second cameras are arranged to have a common overlapping portion between each of the N second cameras.

11. The imaging system of claim 10, wherein the at least one processor is configured to control a tilt of a given second camera in a manner that an angular width of the common overlapping portion is greater than a predefined angular width.

12. The imaging system of claim 11, wherein the at least one processor is configured to:
   receive, from a display apparatus, information indicative of a gaze direction of a user;
   determine, based on the gaze direction, a gaze point in the first field of view captured in the first image; and
   control the tilt of the given second camera in a manner that the common overlapping portion includes and surrounds the gaze point.

13. The imaging system of claim 10, wherein the at least one processor is configured to crop a given second image to include the common overlapping portion.

14. The imaging system of claim 1, wherein the predefined threshold angle lies in a range 5-30 degrees.

15. The imaging system of claim 1, wherein the first field of view has an angular width that lies in a range of 60-220 degrees, and the second field of view has an angular width that lies in a range of 5-45 degrees.

16. The imaging system of claim 1, wherein a resolution of a given second image lies in a range of 95-105% of 1/Nth of 60 pixels per degree.

17. The imaging system of claim 1, wherein the at least one processor is configured to:
receive, from a display apparatus, information indicative of a gaze direction of a user;
determine, based on the gaze direction, a gaze point in the first field of view captured in the first image; and
determine a sub-portion of the overlapping portion of the at least one of the N second images that lies outside a circle having the gaze point as its centre and a predefined threshold distance as its radius,
wherein, when processing the given overlapping portion of the first image and the overlapping portion of the at least one of the N second images, the at least one processor is configured to process only a remaining sub-portion of the overlapping portion of the at least one of the N second images with the given overlapping portion of the first image to generate the corresponding portion of the output image.

18. The imaging system of claim 1, wherein the at least one processor is configured to:
receive, from a display apparatus, information indicative of a gaze direction of a user;
determine, based on the gaze direction, a gaze point in the first field of view captured in the first image;
determine a sub-portion of the overlapping portion of the at least one of the N second images that lies outside a circle having the gaze point as its centre and a predefined threshold distance as its radius; and
receive only a remaining sub-portion of the overlapping portion of the at least one of the N second images from a corresponding second camera,
wherein, when processing the given overlapping portion of the first image and the overlapping portion of the at least one of the N second images, the at least one processor is configured to process only the remaining sub-portion of the overlapping portion of the at least one of the N second images with the given overlapping portion of the first image to generate the corresponding portion of the output image.

19. The imaging system of claim 1, wherein, when processing the given overlapping portion of the first image and the overlapping portion of the at least one of the N second images, the at least one processor is configured to:
determine an overlapping portion of at least one other of the N second images that overlaps with the given overlapping portion of the first image and the overlapping portion of the at least one of the N second images;
generate a corresponding portion of an intermediate image from the overlapping portion of the at least one of the N second images and the overlapping portion of the at least one other of the N second images; and
fuse the given overlapping portion of the first image and the corresponding portion of the intermediate image to generate the corresponding portion of the output image.

20. The imaging system of claim 1, wherein, when processing the given overlapping portion of the first image and the overlapping portion of the at least one of the N second images, the at least one processor is configured to blend the corresponding portion of the output image with an adjacent portion of the output image.

21. The imaging system of claim 1, wherein the first camera and the N second cameras are focus free, and wherein at least two of the N second cameras have at least one of: different focal lengths, different focusing distances, different distortion profile.

22. A display apparatus comprising:
at least one light source per eye;
a first camera per eye;
N second cameras per eye, an optical axis of a given second camera being arranged at an angle that is lower than a predefined threshold angle with respect to an optical axis of the first camera; and
at least one processor configured to:
control the first camera and the N second cameras to capture simultaneously a first image and N second images of a real-world environment, respectively, wherein a second field of view captured in a given second image is narrower than a first field of view captured in the first image and overlaps with a portion of the first field of view;
determine a plurality of first overlapping portions of the first image that overlap with any one of the N second images, at least one second overlapping portion of the first image that overlaps with any two of the N second images, and a third overlapping portion of the first image that overlaps with each of the N second images;
for a given overlapping portion of the first image, determine an overlapping portion of at least one of the N second images that overlaps with the given overlapping portion of the first image;
process the given overlapping portion of the first image and the overlapping portion of the at least one of the N second images to generate a corresponding portion of an output image; and
display the output image via the at least one light source.

23. The display apparatus of claim 22, wherein the N second cameras are arranged at vertices of an equilateral polygon having N sides.

24. The display apparatus of claim 22, wherein the N second cameras are arranged to have a common overlapping portion between each of the N second cameras.

25. The display apparatus of claim 24, wherein the at least one processor is configured to control a tilt of a given second camera in a manner that an angular width of the common overlapping portion is greater than a predefined angular width.

26. The display apparatus of claim 25, further comprising gaze-tracking means, wherein the at least one processor is configured to:
process gaze-tracking data obtained from the gaze-tracking means to determine a gaze direction of a user;
determine, based on the gaze direction, a gaze point in the first field of view captured in the first image; and
control the tilt of the given second camera in a manner that the common overlapping portion includes and surrounds the gaze point.

27. The display apparatus of claim 22, further comprising gaze-tracking means, wherein the at least one processor is configured to:
process gaze-tracking data obtained from the gaze-tracking means to determine a gaze direction of a user;
determine, based on the gaze direction, a gaze point in the first field of view captured in the first image; and
determine a sub-portion of the overlapping portion of the at least one of the N second images that lies outside a circle having the gaze point as its centre and a predefined threshold distance as its radius, wherein, when processing the given overlapping portion of the first image and the overlapping portion of the at least one of the N second images, the at least one processor is configured to process only a remaining sub-portion of the overlapping portion of the at least one of the N second images with the given overlapping portion of the first image to generate the corresponding portion of the output image.

28. The display apparatus of claim 22, further comprising gaze-tracking means, wherein the at least one processor is configured to:
process gaze-tracking data obtained from the gaze-tracking means to determine a gaze direction of a user;
determine, based on the gaze direction, a gaze point in the first field of view captured in the first image;
determine a sub-portion of the overlapping portion of the at least one of the N second images that lies outside a circle having the gaze point as its centre and a predefined threshold distance as its radius; and
receive only a remaining sub-portion of the overlapping portion of the at least one of the N second images from a corresponding second camera,
wherein, when processing the given overlapping portion of the first image and the overlapping portion of the at least one of the N second images, the at least one processor is configured to process only the remaining sub-portion of the overlapping portion of the at least one of the N second images with the given overlapping portion of the first image to generate the corresponding portion of the output image.

29. The display apparatus of claim 22, wherein, when processing the given overlapping portion of the first image and the overlapping portion of the at least one of the N second images, the at least one processor configured to:
determine an overlapping portion of at least one other of the N second images that overlaps with the given overlapping portion of the first image and the overlapping portion of the at least one of the N second images;
generate a corresponding portion of an intermediate image from the overlapping portion of the at least one of the N second images and the overlapping portion of the at least one other of the N second images; and
fuse the given overlapping portion of the first image and the corresponding portion of the intermediate image to generate the corresponding portion of the output image.

30. The display apparatus of claim 22, wherein, when processing the given overlapping portion of the first image and the overlapping portion of the at least one of the N second images, the at least one processor is configured to blend the corresponding portion of the output image with an adjacent portion of the output image.

\* \* \* \* \*